US009471176B2

(12) United States Patent
Nikolic et al.

(10) Patent No.: US 9,471,176 B2
(45) Date of Patent: *Oct. 18, 2016

(54) FLIGHT DECK TOUCH-SENSITIVE HARDWARE CONTROLS

(71) Applicant: The Boeing Company, Chicago, IL (US)

(72) Inventors: Mark Ivan Nikolic, Seattle, WA (US); Stephen Minarsch, Seattle, WA (US)

(73) Assignee: The Boeing Company, Chicago, IL (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/509,063

(22) Filed: Oct. 8, 2014

(65) Prior Publication Data

US 2015/0022479 A1 Jan. 22, 2015

Related U.S. Application Data

(62) Division of application No. 13/606,082, filed on Sep. 7, 2012, now Pat. No. 8,886,372.

(51) Int. Cl.
*G01C 23/00* (2006.01)
*G05D 1/00* (2006.01)
*G05D 3/00* (2006.01)
(Continued)

(52) U.S. Cl.
CPC ............ *G06F 3/0416* (2013.01); *G01C 23/00* (2013.01); *G01C 23/005* (2013.01); *G05D 1/00* (2013.01); *G06F 3/00* (2013.01); *G06F 3/0488* (2013.01)

(58) Field of Classification Search
None
See application file for complete search history.

(56) References Cited

U.S. PATENT DOCUMENTS 4,185,281 A 1/1980 Silverstone
4,390,861 A 6/1983 Cohen et al.
(Continued)

FOREIGN PATENT DOCUMENTS

CN 101046715 A 10/2007
CN 102279670 A 12/2011
(Continued)

OTHER PUBLICATIONS

PCT International Preliminary Report on Patentability dated Mar. 19, 2015, International Application No. PCT/US2013/040188 (PCT counterpart to U.S. Appl. No. 13/606,082, the parent of the instant patent application).

(Continued)

*Primary Examiner* — Yonel Beaulieu
*Assistant Examiner* — Lail Kleinman
(74) *Attorney, Agent, or Firm* — Ostrager Chong Flaherty & Broitman P.C.

(57) ABSTRACT

Touch or proximity sensors are integrated into control devices such as knobs, dials or wheels incorporated in a user control panel. A control output processor detects whether any of the sensors are outputting signals indicating that a control device is being touched (or nearly touched) by a user. The control output processor causes an associated display area to be highlighted or otherwise modified on a display screen to indicate to the user which control device is being touched. This feature allows for "no-look" interaction with control panels, and keeps the user's eyes focused on the relevant displays where the control devices produce effects. This allows users to preview and verify that the correct control device is being manipulated prior to taking any (potentially erroneous) control actions.

20 Claims, 5 Drawing Sheets

(51) Int. Cl.
*G06F 7/00* (2006.01)
*G06F 17/00* (2006.01)
*G06F 7/70* (2006.01)
*G06F 19/00* (2011.01)
*G06G 7/00* (2006.01)
*G06G 7/76* (2006.01)
*G06F 3/041* (2006.01)
*G06F 3/00* (2006.01)
*G06F 3/0488* (2013.01)

(56) References Cited

U.S. PATENT DOCUMENTS

| | | | |
|---|---|---|---|
| 4,811,230 A | 3/1989 | Graham et al. |
| 4,860,007 A | 8/1989 | Konicke et al. |
| 4,922,061 A | 5/1990 | Meadows et al. |
| 5,398,045 A | 3/1995 | Sach et al. |
| 5,844,503 A | 12/1998 | Riley et al. |
| 6,112,141 A | 8/2000 | Briffe et al. |
| 6,128,553 A | 10/2000 | Gordon et al. |
| 6,130,663 A | 10/2000 | Null |
| 6,567,014 B1 | 5/2003 | Hansen et al. |
| 6,587,056 B1 | 7/2003 | Fraser et al. |
| 6,664,945 B1 | 12/2003 | Eich et al. |
| 6,745,113 B2 | 6/2004 | Griffin et al. |
| 7,256,710 B2 | 8/2007 | Mumaw et al. |
| 7,308,343 B1 | 12/2007 | Horvath et al. |
| 7,321,318 B2 | 1/2008 | Crane et al. |
| 7,346,854 B2 | 3/2008 | Hedrick |
| 7,418,319 B2 | 8/2008 | Chen et al. |
| 7,512,464 B2 | 3/2009 | Tarleton et al. |
| 7,602,382 B2 | 10/2009 | Hinckley et al. |
| 7,626,515 B1 | 12/2009 | Langner et al. |
| 7,724,259 B2 | 5/2010 | Hedrick et al. |
| 7,772,995 B2 | 8/2010 | Cabaret De Alberti et al. |
| 7,834,779 B2 | 11/2010 | He et al. |
| 8,098,175 B2 | 1/2012 | Berthou et al. |
| 8,132,117 B2 | 3/2012 | Hedrick |
| 8,165,810 B2 | 4/2012 | Fetzmann et al. |
| 8,223,119 B1 | 7/2012 | Krenz et al. |
| 8,312,479 B2 | 11/2012 | Boillot |
| 8,380,366 B1 * | 2/2013 | Schulte ............... G01C 23/00 701/120 |
| 8,520,015 B2 | 8/2013 | Krishna et al. |
| 8,694,184 B1 | 4/2014 | Boorman et al. |
| 8,761,971 B2 | 6/2014 | Gershzohn |
| 8,886,372 B2 * | 11/2014 | Nikolic et al. ............... 701/14 |
| 2005/0231390 A1 | 10/2005 | Crane et al. |
| 2006/0164260 A1 | 7/2006 | Berthou et al. |
| 2007/0046680 A1 | 3/2007 | Hedrick et al. |
| 2007/0198141 A1 | 8/2007 | Moore |
| 2009/0009491 A1 | 1/2009 | Grivna |
| 2009/0019188 A1 | 1/2009 | Mattice et al. |
| 2009/0237372 A1 | 9/2009 | Kim et al. |
| 2009/0289902 A1 | 11/2009 | Carlvik et al. |
| 2010/0001132 A1 | 1/2010 | Detouillon et al. |
| 2010/0053107 A1 | 3/2010 | Tsuzaki et al. |
| 2011/0125347 A1 | 5/2011 | Boorman et al. |
| 2012/0050180 A1 | 3/2012 | King et al. |
| 2012/0050210 A1 | 3/2012 | King et al. |
| 2012/0113051 A1 | 5/2012 | Bird et al. |
| 2012/0154307 A1 | 6/2012 | Nunomaki |
| 2012/0169623 A1 | 7/2012 | Grossman et al. |
| 2012/0235892 A1 | 9/2012 | Narendra et al. |
| 2012/0242608 A1 | 9/2012 | Koshiyama et al. |
| 2012/0256768 A1 * | 10/2012 | Kratchounova ....... G01C 23/00 340/973 |
| 2012/0268374 A1 | 10/2012 | Heald |
| 2012/0296496 A1 | 11/2012 | Hedrick et al. |
| 2012/0327034 A1 | 12/2012 | Dominici et al. |

FOREIGN PATENT DOCUMENTS

| | | |
|---|---|---|
| DE | 10015726 A1 | 10/2001 |
| DE | 102005049514 A1 | 5/2006 |
| DE | 102010012239 A1 | 9/2011 |
| EP | 1932727 A1 | 6/2008 |
| EP | 2045789 A2 | 4/2009 |
| JP | 2006507988 A | 3/2006 |

OTHER PUBLICATIONS

PCT International Search Report and Written Opinion dated Jan. 7, 2014, International Application No. PCT/US2013/040188 (PCT counterpart to U.S. Appl. No. 13/606,082).

First Chinese Office Action dated Jun. 3, 2016, Chinese Patent Application No. 201380046567.6 (Chinese counterpart to U.S. Appl. No. 13/606,082, the parent of the instant patent application).

English Abstract for CN 102279670 A.

English Abstract for JP 2006507988 A.

\* cited by examiner

FLIGHT DECK TOUCH-SENSITIVE HARDWARE CONTROLS

RELATED PATENT APPLICATION

This application is a divisional of and claims priority from U.S. patent application Ser. No. 13/606,082 filed on Sep. 7, 2012, which was issued as U.S. Pat. No. 8,836,372 on Nov. 11, 2014.

BACKGROUND

This disclosure generally relates to a user interface for enabling a user to control a mode of a machine. In particular, this disclosure relates to hardware control devices on a flight deck of an aircraft.

Modern jet transports are equipped with a cockpit mode control panel that interfaces with a flight management system to control the selection and engagement of automatic flight control modes of operation. These automatic flight control modes of operation include, for example, flight level change (FLCH), vertical navigation (VNAV) and lateral navigation (LNAV). The FLCH mode can automatically manage thrust and speed to climb or descend from one altitude to another. The VNAV mode can provide automatic optimized profile control from initial climb through final approach, including adherence to terminal area procedure speed and altitude constraints. The LNAV mode can provide steering to a preprogrammed route including selected terminal area procedures.

The pilot chooses the available modes that will best accomplish the desired vertical flight profile and lateral routing. In most instances, the pilot plans the flight in advance, both laterally and vertically, and preprograms the LNAV and VNAV modes so that the desired flight path will be followed. While preprogrammed flights are advantageous because they reduce the pilot's burden, particularly during takeoff and landing, in practice, rarely can flights be flown as preplanned. For example, rerouting and clearance instructions may be received from air traffic control (ATC) during the flight. These instructions force the pilot to depart from the vertical flight profile and/or the lateral route that was originally planned. In some instances, rerouting and reclearance come far enough in advance to allow the pilot to reprogram the route or profile instructions stored in the memory of an auto flight computer so that the flight management system can remain in the LNAV and VNAV flight control modes. On other occasions, pilots are forced to manually intervene in order to depart from LNAV and VNAV preprogrammed flight paths and comply with ATC instructions in a timely manner.

Intervention-capable flight management systems (FMS) have been developed which allow a pilot to intervene in the operation of the preprogrammed auto flight computer of a flight management system and change the speed and/or flight path of an aircraft in response to ATC instructions. One such system is disclosed in U.S. Pat. No. 4,811,230, and entitled "Intervention Flight Management System." The intervention FMS disclosed in that patent includes a mode control panel via which the pilot interfaces with an FMS program. The FMS program includes several modules that override the preprogrammed instructions stored in the memory of the auto flight computer when the modules are engaged. In this manner, the FMS allows the pilot to manually intervene and control the auto flight computer and, thus, the aircraft in response to, for example, ATC instructions to change heading, altitude, airspeed or vertical speed. The FMS automatically returns to fully optimized flight along the preprogrammed profile when the intervention is cancelled.

An FMS control panel consists of a multitude of control devices for enabling a pilot to interact with airplane systems and displays. Often these control devices produce a corresponding change to an associated display. For example, turning a knob in one location can change a displayed value in another location. However, some control devices are typically used without looking directly at the controls. To avoid confusion, similarly shaped control devices can be discriminated from each other spatially and sometimes with unique textures. However, operation of the hardware controls on the flight deck is still susceptible to confusion because these control devices do not completely prevent the pilot from reaching for and activating the wrong control device. Furthermore, pilots sometimes only detect the error after the incorrect control device has been used, which produces an unexpected change in the associated display (and sometimes unwanted aircraft performance).

There is a need for an improved system and method that can be used to help avoid such control errors.

SUMMARY

An improved system and method for enabling a control panel user, while looking at an associated display screen rather than the control panel, to verify that the user is touching a correct control device on that control panel. In accordance with some embodiments, touch or proximity sensors are integrated into control devices such as knobs, dials, levers, or wheels incorporated in a user control panel. A control output processor detects whether any of these sensors are outputting signals indicating that a control device is being touched (or nearly touched) by a user. The control output processor causes an associated display area to be highlighted or otherwise modified on a display screen to visually indicate to the user which control device is being touched. (An "associated" display area is a region on a display screen that will be affected by an action performed by the user when manipulating the touched control device.) This feature allows for "no-look" interaction with control panels, and keeps the user's eyes focused on the relevant displays where the control devices produce effects. This allows users to preview and verify that the correct control device is being manipulated prior to taking any (potentially erroneous) control actions and without the user looking at the control panel.

The benefits of the above-described system and method include at least the following:

(1) The highlighting (or other visual change) offers a preview of where the control inputs will produce changes on the display device. This allows the user to find the correct control while keeping his/her visual attention directed at a non-collocated display device, without necessarily having to refocus attention to find the correct control device.

(2) Because the user can direct his/her attention toward a display device rather then the control device he/she is manipulating, the control panel can be simplified and less feedback/data on the panel itself (such as numerical windows or other displays) is required. Information (e.g., control settings and values) can be consolidated on the main display rather than being redundantly shown on the control panel.

(3) The foregoing technical feature aids with error prevention by confirming that the correct control device is being touched prior to taking action by manipulating the control device.

One aspect of the subject matter disclosed in detail below is a method for producing a visual indication that a user is touching a control device on a control panel, comprising: producing an electrical user proximity signal whenever the user is currently touching the control device; producing a first electrical display control signal in response to the absence of an electrical user proximity signal for a time interval having a duration greater than a first threshold value; while the first electrical display control signal is being produced, displaying a first image in an area on a display screen that is associated with the control device, but is not part of or collocated with the control panel, the first image comprising a visual indication of a current setting of the control device; producing a second electrical display control signal in response to the presence of an electrical user proximity signal for a time interval having a duration greater than a second threshold value; and displaying a second image in the area on the display screen while the second electrical display control signal is being produced, the second image comprising the visual indication of the current setting of the control device, wherein the second image is different than the first image.

Optionally, the method described in the preceding paragraph may be adapted to produce a visual indication that a user is touching or nearly touching the control device on the control panel, in which case the electrical user proximity signal will be produced whenever the user is currently touching or nearly touching the control device.

Another aspect of the subject matter disclosed in detail below is a method for producing a visual indication that a user is touching or nearly touching a control device on a control panel, the visual indication being displayed on a display screen that is not part of or collocated with the control panel device, the method comprising the following operations: (a) controlling a portion of the display screen to display default display symbology without any touch-indicative visual indicator, the default display symbology comprising a visual indication of a current setting of the control device; (b) in response to a control device being touched or nearly touched by a user while the default display symbology is being displayed, producing an electrical user proximity signal; (c) determining whether the electrical user proximity signal has been present for a duration greater than a first threshold value; (d) if the electrical user proximity signal has been present for a duration greater than the first threshold value, controlling the portion of the display screen which is associated with the control device to display a touch-indicative visual indicator concurrently with the visual indication of the current setting of the control device; (e) determining whether the electrical user proximity signal has been absent for a duration greater than a second threshold value; and (f) if the electrical user proximity signal has been absent for a duration greater than the second threshold value, returning to operation (a), wherein operations (a) and (c) through (f) are performed by a computer system. The touch-indicative visual indicator may be selected from a group comprising the following: a color change, shading, highlighting, a pattern, a graphical symbol, and an icon.

Other aspects of methods for producing a visual indication that a user is touching a control device on a control panel are disclosed below.

BRIEF DESCRIPTION OF THE DRAWINGS

Reference will hereinafter be made to the drawings in which similar elements in different drawings bear the same reference numerals.

DETAILED DESCRIPTION

Figure 1:
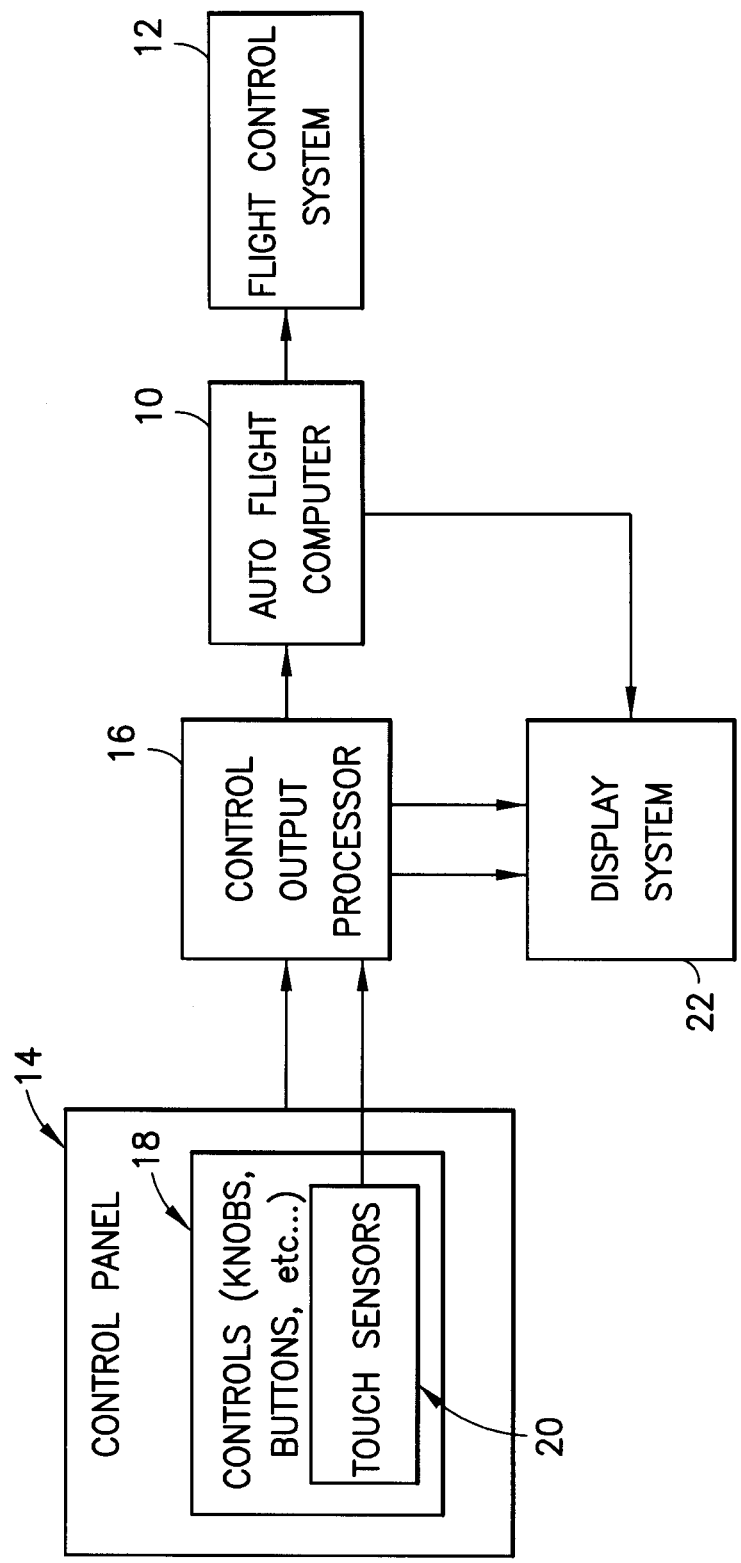
FIG. 1 is a block diagram illustrating a flight management system (FMS) in accordance with one embodiment.

Modern aircraft may employ a flight management system (FMS). FIG. 1 is a block diagram illustrating one example of an FMS formed in accordance with one specific application of the concept disclosed herein. The FMS of the embodiment of FIG. 1 comprises an auto flight computer 10 that has been programmed to control the state of various hardware components of a flight control system 12. A conventional fixed-wing aircraft flight control system consists of flight control surfaces (e.g., ailerons, elevators and rudder), connecting linkages, and the necessary operating mechanisms to control an aircraft's direction in flight. Aircraft engine controls are also considered as flight controls as they change speed. These operating mechanism components include, for example, roll, pitch and autothrottle control actuators (not shown). These control actuators may comprise any suitable actuators for controlling the roll, pitch and autothrottle of an aircraft, such as servos and fly-by-wire actuators.

The embodiment shown in FIG. 1 further comprises a mode control panel 14 which transmits commands to the auto flight computer 10 via a control output processor 16. The electrical signals representing these commands are generated in response to the pilot contacting and manipulating various control devices 18, such as knobs, wheels, levers and buttons, which are incorporated in the control panel 14. In another embodiment, the auto flight computer 10 periodically interrogates the status of the control devices 18 and uses the resultant information to engage, disengage and control paths through the modules of an FMS program stored in the auto flight computer 10, along with programs that create other automatic flight control modes, such as LNAV and VNAV flight control modes.

The mode control panel 14 also receives current parameter value signals (not shown) from the auto flight computer 10. The auto flight computer 10 also sends current parameter value signals to a display system 22 for display thereby. The display system 22 comprises a primary flight display that is configured to display symbology, graphical elements, icons, coloring, shading, highlighting, etc. in order to visually communicate air data and basic flight information.

In accordance with the embodiment shown in FIG. 1, based on preprogrammed instructions and/or commands, the auto flight computer 10 produces guidance commands, which are applied to the actuators of the flight control system 12. In accordance with these guidance commands, command signals are applied to the actuators by respective actuator amplifiers (not shown), such as a roll actuator amplifier, a pitch actuator amplifier and a thrust actuator amplifier. The actuators produce feedback actuator position signals (not shown) which are sent back to the respective actuator amplifiers. As a result, actuator loop control systems are formed between the roll actuator amplifier and the roll actuator, between the pitch actuator amplifier and the pitch actuator, and between the thrust actuator amplifier and the autothrottle actuator.

The guidance commands produced by the auto flight computer 10 control the orientation and speed of the aircraft in a well-known manner. In this regard, it should be understood that FIG. 1 is a simplified block version of a sophisticated system for controlling the orientation and speed of an aircraft. As explained in more detail below, the disclosed embodiments are directed to a FMS in which the state of the primary flight display is determined in response to and as a function of pilot manipulation of the control devices 18 incorporated in the mode control panel 14. Accordingly, the well-known details of how the auto flight computer 10 controls the orientation and speed of an aircraft using the flight control system 12 are not disclosed herein.

The mode control panel 14 allows a user, such as a pilot of the aircraft, to interface with the FMS. The mode control panel 14 may include a number of different sections, such as a direction section, an altitude section, a speed section and a vertical path section, for allowing the pilot to control various functions of the FMS. (One example of such a mode control panel will be described later with reference to FIG. 2.) Each section comprises one or more control devices 18, as previously described. In accordance various embodiments disclosed herein, independent of the respective settings of the control devices, sensing means are providing for detecting when the control devices are touched (e.g., by a pilot placing a finger in contact with a control device) or nearly touched.

In accordance with one embodiment, the mode control panel 14 further comprises a multiplicity of touch or proximity sensors 20, each touch sensor corresponding to a respective control device having an associated graphical element to be displayed on the primary flight display (described in detail below). In these embodiments, each touch sensor 20 outputs a signal in response to an effect of a pilot's finger touching or closely approaching a corresponding control device. Many different types of touch or proximity sensors capable of being integrated into a control device could be used. In accordance with one embodiment, the sensors can be capacitive-type touch sensors of types which are well-known for use as human interface devices. Capacitive sensing is a technology based on capacitive coupling which takes human body capacitance as input. Capacitive sensors detect anything that is conductive or has a dielectric constant different than that of air. Capacitive sensors can be constructed from many different media, such as copper, indium tin oxide and printed ink. There are two types of capacitive sensing systems: (1) mutual capacitance, where the object (such as a finger) alters the mutual coupling between two electrodes; and (2) self- or absolute capacitance, where the object (such as a finger) loads the sensor or increases the parasitic capacitance to ground. In both cases, the difference of a preceding absolute position from the present absolute position yields the relative motion of the object or finger during that time. In accordance with alternative embodiments, the sensors can be infrared detectors which react to infrared radiation, such as infrared radiation emitted by a pilot's finger.

In accordance with a different design, rather than incorporating individual touch sensors into the design of the control devices (which may have different sizes and shapes), the human interface state of a control device can be monitored by an infrared camera mounted to the mode control panel.

The control output processor 16 processes the touch sensor outputs and then sends display control signals to the display system 22 which cause the primary flight display of the latter to display symbology, graphical elements, icons, coloring, shading, highlighting, changes in font size, etc. which indicate to the pilot which control device he/she is touching, as will be described in more detail below with reference to FIGS. 2 and 3.

The control output processor 16 processes the touch sensor outputs in accordance with an algorithm designed to discriminate each instance where a control device 18 of interest has been touched or nearly touched by a pilot in a predetermined manner. One embodiment of such an algorithm will be described later with reference to FIG. 4. After the touch sensor outputs have been processed, the control output processor 16 controls the primary flight display screen accordingly. For example, the control output processor 16 may execute a software application whereby an area of the primary flight display, e.g., an area on the screen that is associated with the particular pilot-actuated control device, is controlled to display a graphical element, symbol, icon, or add coloring, shading or highlighting that is designed to visually indicate to the pilot which control device he/she is touching or manipulating while his attention is directed to the primary flight display.

Figure 2:
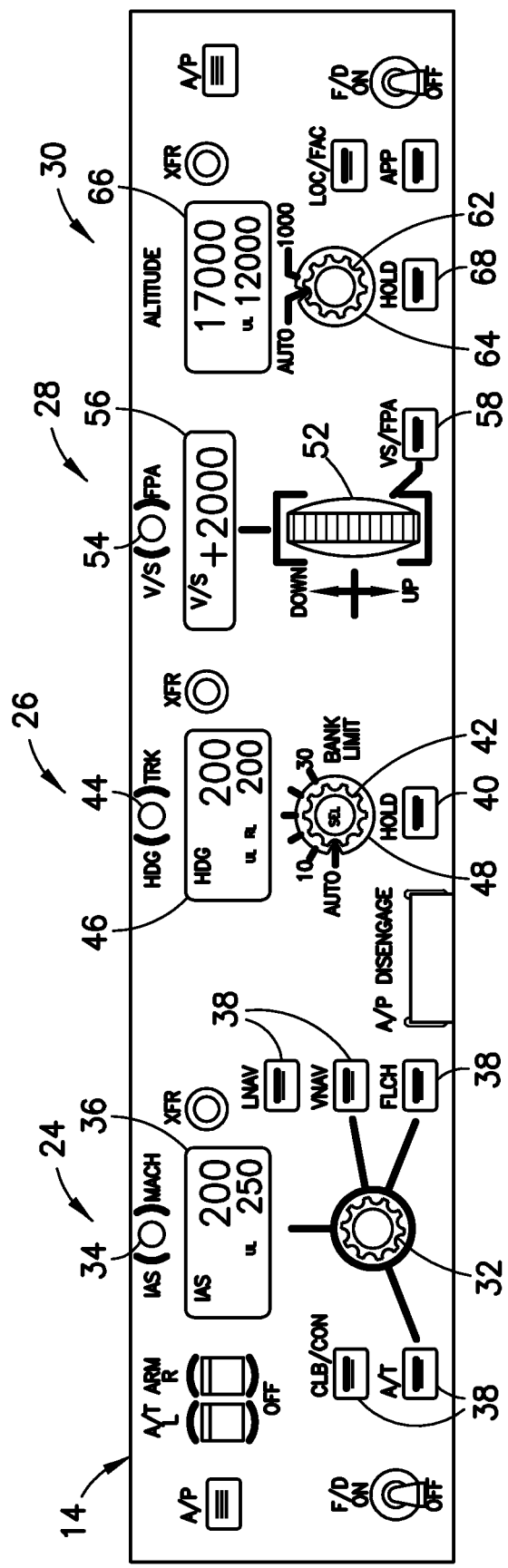
FIG. 2 is a diagram showing a front view of an FMS control panel incorporated in the system depicted in FIG. 1.

FIG. 2 is a front view of a FMS mode control panel 14 in accordance with the embodiment. The mode control panel 14 provides control of the auto flight computer, flight director, altitude alert and autothrottle system. The mode control panel 14 is used to select and activate autopilot flight director system (AFDS) modes and establish altitudes, speeds and climb/descent profiles. The mode control panel 14 comprises a speed section 24, a direction section 26, a vertical path section 28, and an altitude section 30. In addition to knobs/wheel and switches, each section of the mode control panel 14 includes related display windows.

For this embodiment, the speed section 24 comprises a speed knob/selection button 32, an indicated airspeed (IAS)/MACH number speed mode selection switch 34, a speed display window 36 that displays the speed selected, and mode selection buttons 38 with mode active indicator lights. The IAS/MACH speed mode selection switch 34 is a toggle switch that allows the pilot to choose between IAS and MACH number speed modes of operation, including alternately changing the speed display window 36 between IAS and Mach number displays. In operation, the mode selection buttons 38 can be pushed to engage a particular mode of guidance (i.e., LNAV, VNAV, FLCH or A/T (auto-throttle)) and can illuminate to indicate that the selected mode is active.

A speed management module is engaged by pushing speed knob/selection button 32. The term "module" as used herein, may refer to any combination of software, firmware, or hardware used to perform the specified function or functions. When speed knob/selection button 32 is pushed, the speed management module is synchronized to the current aircraft speed. Thereafter the speed of the aircraft is increased or decreased by rotating the speed knob/selection button 32. During knob rotation, the indicated speeds in the speed display window 36 and in the primary flight display (not shown in FIG. 2) are set to the selected speed. Pushing speed knob/selection button 32 a second time exits the speed management mode of operation and engages a speed transition module for returning control of the aircraft to the preprogrammed speed profile, such as, for example, a VNAV speed profile stored in the auto flight computer 10.

Referring again to FIG. 2, the direction section 26 of the mode control panel 14 comprises a heading knob/selection button 42, a heading/track mode selection switch 44, and a direction display window 46 that displays the selected heading or track. The heading/track mode selection switch 44 is a toggle switch that allows the pilot to choose between heading and track modes of operation and alternately changes the direction display window 46 and the primary flight display (not shown in FIG. 2) references between vertical speed and FPA. A direction management module is engaged by pushing the heading knob/selection button 42, thereby selecting Heading Select or Track Select as the roll mode. The bank angle is limited by the angular position of an outer knob or sleeve 48 (such a bank limit selector is well known in the art and will not be described in detail herein). Rotating the heading knob/selection button 42, after it has been pushed, controls the direction of the airplane, i.e., rotation of the heading knob steers the airplane, and sets the heading or track in the direction display window 46 and in the primary flight display. A second depression of the heading knob/selection button 42 cancels pilot management of the airplane's direction. This results in the airplane intercepting and following the preprogrammed flight route entered into the auto flight computer 10 prior to takeoff or during the flight. That is, the airplane returns the LNAV mode of operation of the auto flight computer 10. If the airplane is not on the preprogrammed flight route when pilot management of direction is cancelled, the airplane follows the heading or track determined by the angular position of the heading knob/selection button 42 until the preprogrammed flight route is captured. Pushing the heading HOLD switch 40 selects Heading Hold or Track Hold as the roll mode and maintains the current aircraft heading.

Still referring to FIG. 2, the vertical path section 28 of the mode control panel 14 comprises a vertical speed wheel 52, a vertical speed (VS)/flight path angle (FPA) mode selection switch 54; a vertical path display window 56 that displays the selected VS or FPA, and a VS/FPA switch 58 (with integrated light). Pushing the VS/FPA switch 58 engages a vertical path subroutine (i.e., the VS/FPA mode) and displays the current vertical speed or FPA in the vertical path display window 56. The light of switch 58 indicates that the VS/FPA mode is engaged. The VS/FPA mode selection switch 54 is a toggle switch that toggles between vertical speed and flight path angle modes of operation. The vertical path subroutine is synchronized to the current vertical speed or flight path angle, depending upon the state of the VS/FPA mode selection switch 54. The VS/FPA mode selection switch 54 alternately changes the vertical path display window 56 and primary flight display references between vertical speed and FPA. Rotation of the vertical speed wheel 52 in the up or down direction causes the selected criteria (vertical speed or flight path angle) to increase or decrease, depending upon the direction of rotation, and causes the vertical speed or FPA to be set in the vertical path display window 56 and primary flight display (not shown in FIG. 2). When it is desired to terminate vertical path intervention, the pilot can push VS/FPA switch 58 a second time, which results in control of the airplane returning to the preprogrammed instructions stored in the auto flight computer 10. That is, the airplane returns to following the VNAV profile instructions.

Still referring to FIG. 2, the altitude section 30 of the mode control panel 14 comprises an inner altitude knob/selection button 62, an outer altitude increment selector knob 64 and an altitude display window 66. Rotation of the altitude knob/selection button 62 controls the numerical value displayed by the altitude display 66 and by the primary flight display. After the chosen numerical altitude is set, depression of the altitude knob/selection button 62 initiates a climb/descent to the selected altitude. The outer altitude increment selector knob 64 has two settings: AUTO—the altitude selector changes in 100-foot increments; and 1000—the altitude selector changes in 1000-foot increments. The altitude HOLD switch 68 engages Altitude Hold as the pitch mode. The AFDS commands pitch to maintain the current altitude when switch 68 is pushed.

Other control panel devices depicted in FIG. 2 are well known to persons skilled in the art (see, e.g., A/P, F/D, A/T ARM (L/R), CLB/CON, A/T, A/P DISENGAGE, and APP) and need not be described here.

In accordance with the concept shown in FIG. 1, the control panel 14 seen in FIG. 2 further comprises touch sensors (not shown in FIG. 2) that are integrated into the various control devices depicted in FIG. 2, such as the speed knob/selection button 32, the heading knob/selection button 42, the vertical speed wheel 52, and the altitude knob/selection button 62. The control output processor executes an algorithm whereby a corresponding area on the primary flight display is modified as a function of which control panel device is being touched or nearly touched by the pilot. The changes to the primary flight display will now be described in more detail with reference to FIG. 3.

Figure 3:
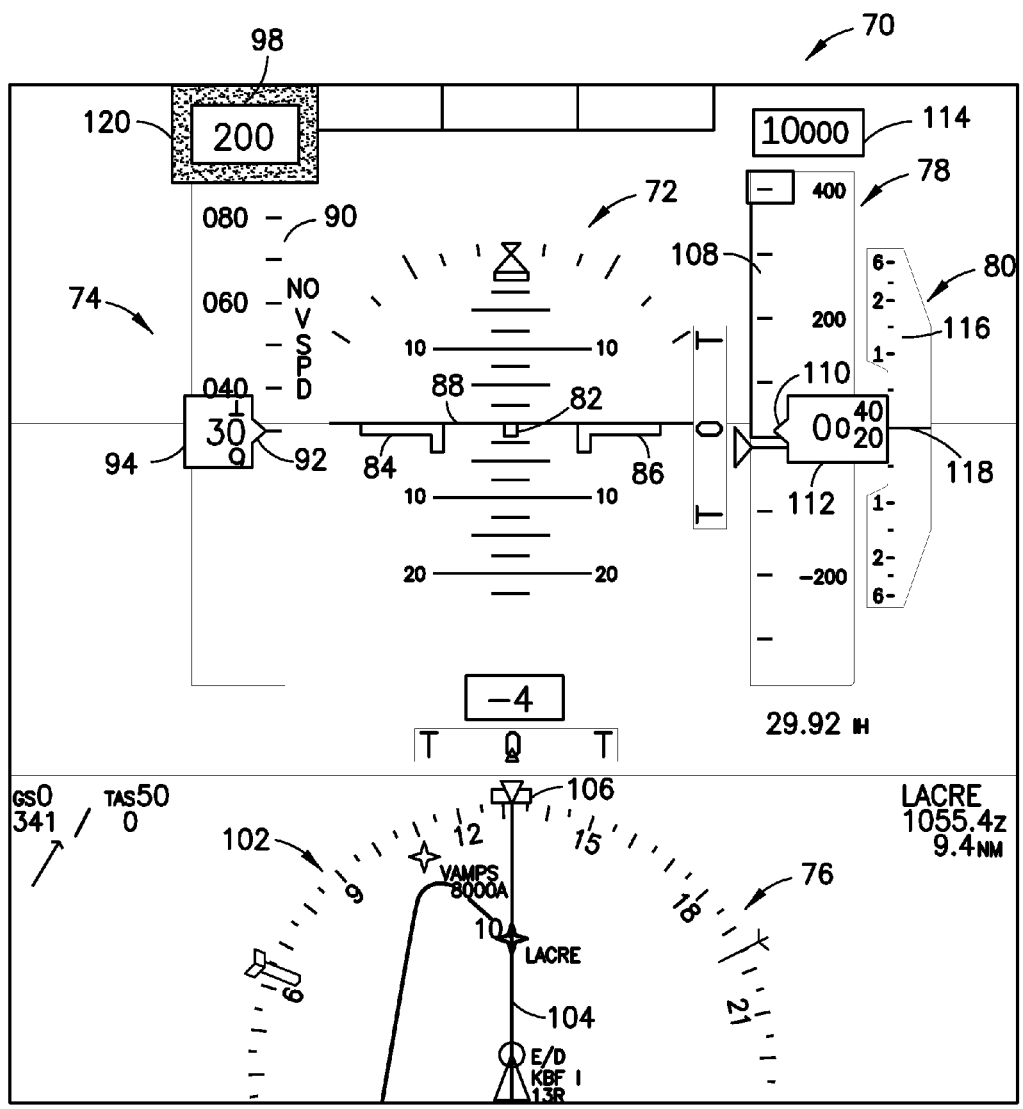
FIG. 3 is a diagram showing a front view of a primary flight display incorporated in the system depicted in FIG. 1.

FIG. 3 shows a primary flight display 70. The display field is divided into a number of indicators 72, 74, 76, 78 and 80. The indicators 74, 76, 80 and 78 (shown in FIG. 3) are respectively associated with speed section 24, direction section 26, vertical path section 28, and altitude section 30 of the control panel 14 (shown in FIG. 2).

The indicator 72 is a centrally located electronic attitude director indicator which is substantially rectangular in shape and has a central boresight box 82 representing the airplane longitudinal axis at the center of the box. On either side thereof are conventional stationary aircraft symbols 84 and 86. An artificial horizon is provided by line 88. The overall presentation by the electronic attitude director indicator 72 is substantially conventional.

Adjacent and along the left-hand side of attitude director indicator 72 is an air speed indicator 74 comprising a vertically movable scale or "tape" 90 having graduations representing air speed values along the right-hand side thereof. The air speed indicator 74 further comprises a fixed pointer 92 which points inwardly toward the air speed scale 90. The pointer 92 is provided with a window 94 digitally indicating the air speed in response to instrumentation of the aircraft. As the air speed changes, the scale or tape 90 moves vertically relative to the fixed pointer 92. The tape 90 presents a range of speed values above and below the current speed, with the numerics being disposed immediately to the left of the corresponding scale graduations. Portions of the scale or tape above and below the viewable range are blanked from the presentation. Moreover, the scale is blanked at the location of window 94 which supplies the numerical readout of the current speed as a "rolling" number. The air speed indicator 74 further includes a pilot-controlled marker or "bug" (not shown in FIG. 3) consisting of a pair of adjacent horizontal lines, with the current value of the selected air speed being numerically displayed at location 98 above the air speed presentation. When the selected air speed is attained, the marker or "bug" 96 will reach pointer 92.

Indicator 76 for aircraft heading comprises an area having the shape of a segment of a circle or compass rose which is easily comprehensible by the viewer. The indicator 76 is provided with a degree scale 102 along the upper, arc-shaped portion thereof adjacent to the attitude director indicator 72, and like the previously described air speed indicator 76, the scale 102 of heading indicator 76 moves with respect to a fixed vertical heading/track line 104 which indicates the current track according to the auto flight computer. For other than the segment of the heading display as illustrated in FIG. 3, the compass rose is blanked out. A selected heading/track bug 106 is displayed at an angular position relative to scale 102 that corresponds to the heading/track selected by the pilot using the mode control panel, while the scale 102 is also positioned in response to the instrumentation such that the heading/track line 104 points to the correct indicia as identified by the numerics displayed at 10-degree intervals underneath the scale 102. In response to a change in the heading of the aircraft, the scale 102 will appear to rotate.

A vertically disposed altitude indicator 78 is located adjacent the right-hand side of the attitude director indicator 72 in FIG. 3, and is provided with an altitude scale 108 along the left-hand side thereof. The altitude indicator 78 is further provided with altitude numerics to the right of appropriate indicia on the scale. The indicator is of the moving scale or moving tape type wherein the scale 108 moves with respect to a fixed pointer 110 as the altitude of the aircraft changes. Fixed pointer 110 includes an adjacent window 112 within which the correct altitude is digitally displayed in rolling number fashion. Thus, as altitude information from aircraft instrumentation changes, both the numerical indicia in window 112 and the position of the underlying tape 108 change accordingly. Altitude indicia for altitudes above and below the range depicted on the viewable scale or tape 108 are blanked, as is the scale beneath window 112. Pointer 110 does not block the view of indicia along the left-hand side of altitude indicator 78, but points fixedly toward such indicia. The current value of the pilot-selected altitude is numerically represented at location 114.

The primary flight display 70 shown in FIG. 3 also includes a vertical speed indicator 80 comprising a scale 116 calibrated in thousands of feet per minute along the left-hand side thereof. The vertical speed indicator 80 is provided with a movable pointer 118 adapted to indicate the current vertical speed of the aircraft by pointing to the indicia of the scale 116, which is fixed in position. Pointer 118 is angularly movable from an apparent origin to the right of the scale 116, from which the pointer appears to extend radially outwardly. After the pilot selects a desired altitude, the vertical speed of the aircraft can be controlled so that pointer 118 points toward the selected altitude on the altitude indicator 78, and under these circumstances the vertical speed will be optimal for leveling out at the desired altitude. Vertical speed indicator 80 may further comprises a bug (not shown) which indicates a desired vertical speed selected by the pilot.

In accordance with the touch-sensitive hardware control concept disclosed herein, each time that the pilot touches or nearly touches a control panel device that incorporates a touch or proximity sensor, an associated portion of the primary flight display is modified to visually indicate to the pilot which control panel device he/she is touching or nearly touching while he/she is looking at the primary flight display.

For the purpose of illustration, FIG. 3 depicts a situation wherein the primary flight display has been modified to visually indicate that the pilot is touching the speed knob/ selection button (item 32 in FIG. 2) on the control panel. In accordance with this embodiment, the control output processor (item 16 in FIG. 1) will cause the display of a contrasting colored rectangle 120 (indicated by the speckled rectangular area depicted in FIG. 3) which surrounds the numeric target air speed display field 98 on the primary flight display. This visible change on the primary flight display indicates to the pilot viewing the primary flight display that he is touching or nearly touching the speed knob/selection button (item 32 in FIG. 2) on the mode control panel. This feature allows the pilot to confirm that he is touching or manipulating the speed knob/selection button 32 without looking at the control panel.

Similarly, in the case where the pilot is touching or nearly touching the altitude knob/selection button (item 62 in FIG. 2) on the control panel, the control output processor (item 16 in FIG. 1) can be programmed to cause the display of a contrasting colored rectangle which surrounds the numeric target altitude display field 114 of the primary flight display 70.

In the case where the pilot is touching or nearly touching the vertical speed wheel (item 52 in FIG. 2) on the control panel, the control output processor (item 16 in FIG. 1) can be programmed to cause the display of a contrasting colored border that surrounds the vertical speed indicator 80 of the primary flight display 70. Alternatively, the vertical speed bug could be highlighted to indicate that the pilot was touching the vertical speed wheel.

Instead of contrasting color borders such as the rectangular border 120 seen in FIG. 1, other types of visual indicators can be used to indicate which control device is being manipulated. For example, in response to detection of pilot contact with a control device, an associated area on the primary flight display may change color or have a pattern imposed thereon or a defined graphical symbol or icon could be imposed on or near the associated area. Alternatively the font size of numbers displayed in a field (e.g., field 98 in FIG. 3) could be increased to indicate touching.

Figure 4:
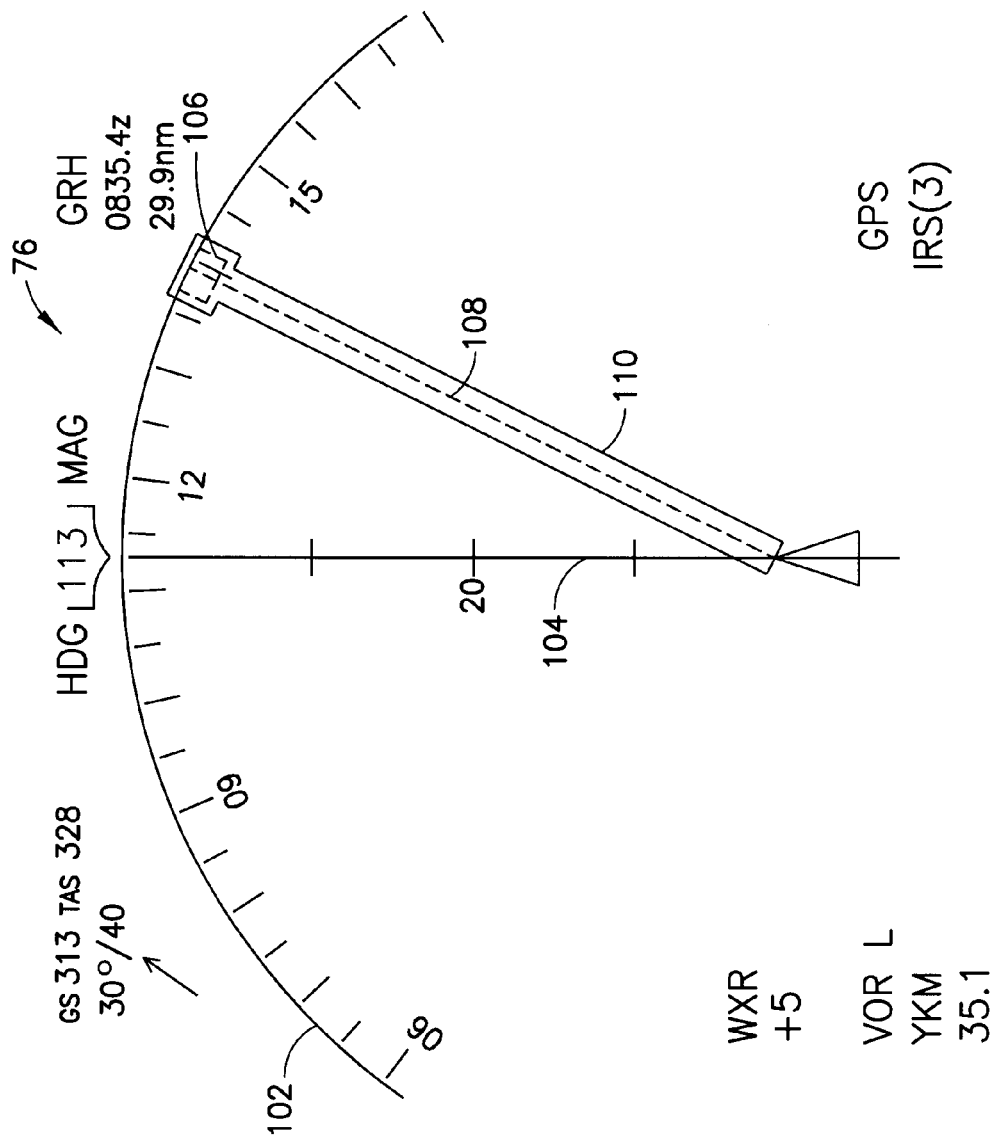
FIG. 4 is a diagram showing a front view of a mini-map of a primary flight display in accordance with the embodiment depicted in FIG. 3.

For example, in the case where the pilot is touching or nearly touching the heading knob/selection button (item 42 in FIG. 2) on the control panel, the control output processor (item 16 in FIG. 1) can be programmed to cause color highlighting of an area 110 that overlies the selected heading/track bug 106 and an area overlying and bisected by a dashed heading/track bug line 108 on a heading indicator 76, as illustrated in FIG. 4. (The area 110 is shown in FIG. 4 without speckling to avoid obscuring the heading/track bug and line.)

Figure 5:
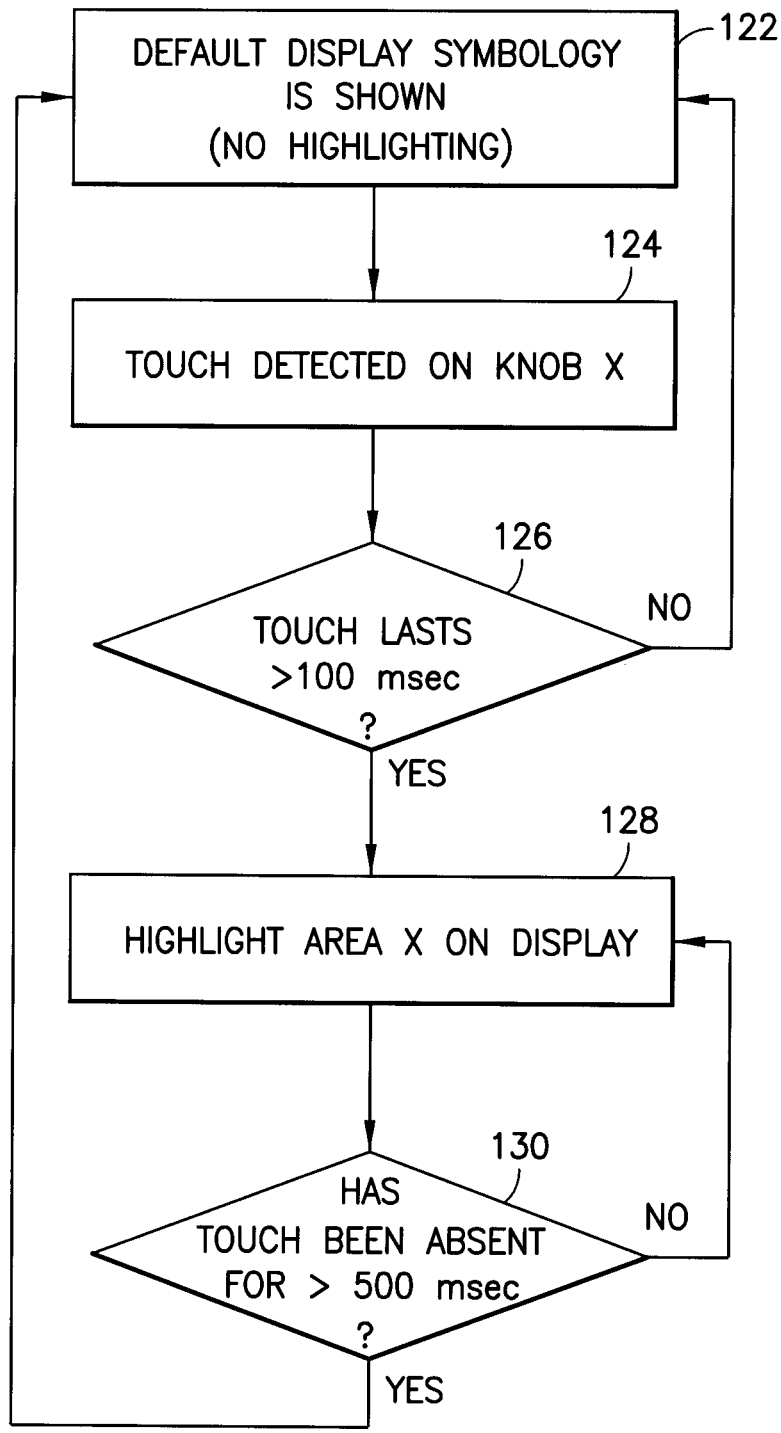
FIG. 5 is a flowchart showing steps of a method for determining the state of a primary flight display as a function of which control device has been touched or nearly touched by the pilot.

In accordance with one embodiment, the control output processor (item 16 in FIG. 1) is programmed to execute the algorithm depicted in FIG. 5. Initially default display symbology is shown on the primary flight display (or other suitable cockpit display) without any touch-indicative highlighting (step 122). In response to a control knob X being touched by the pilot, an associated touch sensor outputs a predetermined signal to the control output processor (step 124). The control output processor then determines whether that predetermined signal has a duration greater than a first preset threshold, e.g., >100 msec (step 126). If not, then no highlighting is displayed. If the predetermined signal has a duration greater than the first preset threshold, an area on the primary flight display which is associated with knob X is highlighted (step 128). The control output processor then determines whether the predetermined signal from the same touch sensor has been absent for a duration greater than a second preset threshold, e.g., >500 msec (step 130). If not, then highlighting is continuously displayed. If the predetermined signal has been absent for a duration greater than the second preset threshold, then the routine returns to step 122 (i.e., default display symbology is shown on the primary flight display without any touch-indicative highlighting).

The touch-sensitive hardware control concept disclosed hereinabove is not limited in its application to the mapping of mode control panel devices to areas on a cockpit or flight deck display. More generally, the concept may be applied to any physically located hardware control devices that have associated areas on a non-collocated display.

While touch-sensitive hardware controls have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed embodiment.

As used in the claims, the term "computer system" should be construed broadly to encompass a system having at least one computer or processor, and which may have two or more interconnected computers or processors.

The invention claimed is:

1. A method for producing a visual indication that a user is touching or nearly touching a control device on a control panel, comprising:
   using a sensor to produce an electrical user proximity signal whenever the sensor detects that the user is currently touching or nearly touching the control device and not produce said electrical user proximity signal whenever the sensor does not detect that the user is touching or nearly touching the control device;
   producing a first electrical display control signal in response to the absence of an electrical user proximity signal for a time interval having a duration greater than a first threshold value;
   while said first electrical display control signal is being produced, displaying a first image in an area on a display screen that is associated with the control device, but is not part of or collocated with the control panel, said first image comprising a visual indication of a current setting of the control device;
   producing a second electrical display control signal in response to the presence of an electrical user proximity signal for a time interval having a duration greater than a second threshold value; and
   displaying a second image in said area on said display screen while said second electrical display control signal is being produced, said second image comprising said visual indication of said current setting of the control device, wherein said second image is different than said first image.

2. The method as recited in claim 1, wherein said first image comprises a first color in a portion of said area on said display screen, and said second comprises a second color in said portion of said area on said display screen, said second color being different than said first color.

3. The method as recited in claim 2, wherein said portion of said area on said display screen surrounds said visual indication of said current setting of the control device.

4. The method as recited in claim 2, wherein said visual indication of said current setting of the control device is located within said portion of said area on said display screen.

5. The method as recited in claim 1, wherein said first image does not include a specified pattern in a portion of said area on said display screen, and said second comprises said specified pattern in said portion of said area on said display screen.

6. The method as recited in claim 5, wherein said portion of said area on said display screen surrounds said visual indication of said current setting of the control device.

7. The method as recited in claim 5, wherein said visual indication of said current setting of the control device is located within said portion of said area on said display screen.

8. The method as recited in claim 1, wherein said first image does not include a defined graphical symbol or icon in a portion of said area on said display screen, and said second comprises said defined graphical symbol or icon in said portion of said area on said display screen.

9. The method as recited in claim 1, wherein said second image comprises a change in said visual indication of said current setting of the control device.

10. The method as recited in claim 9, wherein said visual indication of said current setting of the control device comprises an alphanumeric depiction of a value of said current setting, said alphanumeric depiction having a font size, and further wherein said change in said visual indication of said current setting of the control device comprises a change in the font size of said alphanumeric depiction.

11. A method for producing a visual indication that a user is touching a control device on a control panel, comprising:
    using a sensor to produce an electrical user proximity signal whenever the sensor detects that the user is currently touching the control device;
    producing a first electrical display control signal in response to the absence of an electrical user proximity signal for a time interval having a duration greater than a first threshold value;
    while said first electrical display control signal is being produced, displaying a first image in an area on a display screen that is associated with the control device, but is not part of or collocated with the control panel, said first image comprising a visual indication of a current setting of the control device;
    producing a second electrical display control signal in response to the presence of an electrical user proximity signal for a time interval having a duration greater than a second threshold value; and
    displaying a second image in said area on said display screen while said second electrical display control signal is being produced, said second image comprising said visual indication of said current setting of the control device, wherein said second image is different than said first image.

12. The method as recited in claim 11, wherein said first image comprises a first color in a portion of said area on said display screen, and said second comprises a second color in said portion of said area on said display screen, said second color being different than said first color.

13. The method as recited in claim 12, wherein said portion of said area on said display screen surrounds said visual indication of said current setting of the control device.

14. The method as recited in claim 12, wherein said visual indication of said current setting of the control device is located within said portion of said area on said display screen.

15. The method as recited in claim 11, wherein said first image does not include a specified pattern in a portion of said area on said display screen, and said second comprises said specified pattern in said portion of said area on said display screen.

16. The method as recited in claim 11, wherein said first image does not include a defined graphical symbol or icon in a portion of said area on said display screen, and said second comprises said defined graphical symbol or icon in said portion of said area on said display screen.

17. The method as recited in claim 11, wherein said second image comprises a change in said visual indication of said current setting of the control device.

18. The method as recited in claim 17, wherein said visual indication of said current setting of the control device comprises an alphanumeric depiction of a value of said current setting, said alphanumeric depiction having a font size, and further wherein said change in said visual indication of said current setting of the control device comprises a change in the font size of said alphanumeric depiction.

19. A method for producing a visual indication that a user is touching or nearly touching a control device on a control panel, the visual indication being displayed on a display screen that is not part of or collocated with the control panel device, said method comprising the following operations:

(a) controlling a portion of the display screen to display default display symbology without any touch-indicative visual indicator, said default display symbology comprising a visual indication of a current setting of the control device;

(b) using a sensor to produce an electrical user proximity signal whenever the sensor detects that the control device is being touched or nearly touched by a user while the default display symbology is being displayed;

(c) determining whether the electrical user proximity signal has been present for a duration greater than a first threshold value;

(d) if the electrical user proximity signal has been present for a duration greater than the first threshold value, controlling said portion of the display screen which is associated with the control device to display a touch-indicative visual indicator concurrently with said visual indication of the current setting of the control device;

(e) determining whether the electrical user proximity signal has been absent for a duration greater than a second threshold value; and (f) if the electrical user proximity signal has been absent for a duration greater than the second threshold value, returning to operation (a), wherein operations (a) and (c) through (f) are performed by a computer system.

20. The method as recited in claim 19, wherein said touch-indicative visual indicator is selected from a group comprising the following: a color change, shading, highlighting, a pattern, a graphical symbol, and an icon.

* * * * *